United States Patent
Tseng et al.

(10) Patent No.: US 7,333,248 B2
(45) Date of Patent: Feb. 19, 2008

(54) METHOD AND APPARATUS FOR FASTENING ADJUSTABLE OPTICAL LENSES

(75) Inventors: Jen-Shou Tseng, Miao-Li Hsien (TW); Chih-Wen Huang, Hsinchu (TW); Chuan-Yu Hsu, Hsinchu (TW)

(73) Assignee: Transpacific IP, Ltd., Taipei (TW)

( * ) Notice: Subject to any disclaimer, the term of this patent is extended or adjusted under 35 U.S.C. 154(b) by 992 days.

(21) Appl. No.: 10/063,433

(22) Filed: Apr. 23, 2002

(65) Prior Publication Data

US 2003/0197899 A1 Oct. 23, 2003

(51) Int. Cl.
*G02B 27/02* (2006.01)
*G02B 7/02* (2006.01)
*H04N 1/04* (2006.01)

(52) U.S. Cl. .................. 358/484; 358/474; 359/804; 359/811

(58) Field of Classification Search ............... 359/210, 359/733, 784, 801, 798, 808, 806, 811; 358/474, 358/733, 784, 801, 798, 808, 806, 811, 484
See application file for complete search history.

(56) References Cited

U.S. PATENT DOCUMENTS 4,260,880 A * 4/1981 Thomas .................. 235/454
5,343,853 A * 9/1994 Komi ...................... 600/107
5,627,589 A * 5/1997 Ejima et al. ............. 348/340
5,663,558 A * 9/1997 Sakai ....................... 250/234
5,724,159 A * 3/1998 Nakagawa et al. ........ 358/474
6,444,978 B1 * 9/2002 Mukaibatake ............. 250/281
2002/0024709 A1* 2/2002 Tsai ......................... 359/210
2002/0057467 A1* 5/2002 Tamaru ..................... 358/505
2003/0111588 A1* 6/2003 Chen ...................... 250/208.1

FOREIGN PATENT DOCUMENTS

| JP | 358105668 | * | 6/1983 |
| JP | 360039612 | * | 3/1985 |
| JP | 07177318 | * | 7/1995 |
| JP | 411281357 | * | 10/1999 |

* cited by examiner

*Primary Examiner*—Jerome Grant, II
(74) *Attorney, Agent, or Firm*—Stolowitz Ford Cowger LLP

(57) ABSTRACT

A paper-separating plate is adapted for a paper-separating mechanism having a paper-separating roller. The paper-separating plate placed around a side of the paper-separating roller comprises a main body and a cushion. The main body has a surface and a plurality of grooves and the grooves are positioned on the surface. The cushion is positioned on the surface of the main body and covers the grooves. The cushion positioned over the partial grooves is elastically pressed onto the paper-separating roller. The grooves are linear and the direction of extending the linear grooves is substantially parallel with the axis of the paper-separating roller, the linear grooves neighboring one another or each other. Besides, the cushion is made of flexible material and the main body is made of rigid material.

45 Claims, 6 Drawing Sheets

METHOD AND APPARATUS FOR FASTENING ADJUSTABLE OPTICAL LENSES

BACKGROUND OF INVENTION

1. Field of the Invention

The invention relates in general to a method and an apparatus for fastening adjustable optical lenses. The method and the apparatus can be adapted for an optical scanner.

2. Description of the Related Art

With improvement of software and hardware, a scanner has become a requisite for many computer users. A scanner can scan word or image data of a document, a magazine, a book or a picture, and for input to a computer to process. Among various scanners, the most popular one is flatbed scanner where there is a scanning chassis mounted under a transparent flatbed and capable of reciprocating to scan a document placed on the transparent flatbed. The scanning chassis can not move by itself and it must be driven by a transmission, such as a servomotor, gear wheels, a belt and so on. When a flatbed scanner is used to scan a document, the document is placed on the transparent flatbed, and then a document cover covers the document to press the document so that the document can lie evenly on the transparent flatbed. Next, the scanner can scan the document.

As shown in FIG. 1, there is a scanning chassis of a conventional optical scanner. A light source 100, a reflector group 400, an optical-lens assembly 500, and an optical sensor, such as charged couple device (CCD) 600, are mounted in a case 700 of the scanning chassis. During scanning, after the light source 100 illuminates a document 200, an image of the document 200 can be obtained. The reflector group 400 is composed of many reflectors 401, 402, 403 that reflect the image of the document 200 to transmit it to the optical-lens assembly 500. The optical-lens assembly 500 can receive the image, transmitted by the reflector group 400, of the document 200 and can form the image onto the charged couple device 600.

As shown in FIG. 2, the conventional optical-lens assembly 500 includes an optical-lens group 510, composed of many optical lenses 511, 512, 513, and a round optical-lens sleeve 520 where the optical-lens group 510 is mounted. Before the fabrication of the optical-lens assembly 500 is completed, the adjustment of the relative positions between optical lenses 511, 512, 513 is completed. Afterwards, the optical-lens assembly 500 is directly mounted on a round sleeve 710 of the case 700 by a method for coordinating a shaft and a hole. After the adjustment of the distance between the optical-lens assembly 500 and the charged couple device 600 is completed, a process of coating an adhesive or that of screwing screws is used to fix the optical-lens assembly 500 on the round sleeve 710.

As above mentioned, the method for fabricating the conventional optical-lens assembly 500 includes the adjustment of the optical lenses 511, 512, 513 when mounted on the round optical-lens sleeve 520 and further includes the adjustment of the distance between the optical-lens assembly 500 and the charged couple device 600 when the optical-lens assembly 500 is mounted on the round sleeve 710. Therefore, the method for fabricating the conventional optical-lens assembly 500 needs many adjusting processes, so the time and cost for fabricating it dramatically increases.

SUMMARY OF INVENTION

Accordingly, an objective of the present invention is to provide an apparatus for fastening adjustable optical lenses. The apparatus can be mounted in a scanning chassis of an optical scanner and an optical-lens group can be mounted on the apparatus. Many grooves where many optical lenses are mounted are directly formed on a case of the scanning chassis when the case of the scanning chassis is formed using a process of injection molding. As a result, the optical-lens group can be directly fixed on the case of the scanning chassis. Therefore, the types and the number of the optical lenses can be changed according to requirements. In addition, the number of parts is decreased and the time for adjusting optical lenses is saved.

To achieve the foregoing and other objectives, the present invention provides a method for fastening adjustable optical lenses. The method is suited for a scanning chassis and is used for fastening an optical-lens group. The scanning chassis includes a case, a light source, a reflector group and an optical sensor, wherein the light source, the reflector group and the optical sensor are mounted in the case. The light source is used for illuminating a document and an image of the document is obtained. The reflector group reflects the image of the document to transmit it to the optical sensor through the optical-lens group. The method for fastening adjustable optical lenses includes the following steps.

An optical-lens pedestal is formed in the case and the optical-lens pedestal has at least one groove. The optical-lens- group is mounted on the groove and located between the optical sensor and the reflector group. The optical-lens group can receive the image of the document and can form the image onto the optical sensor.

According to a preferred embodiment of the present invention, the optical-lens pedestal is integrally formed in the case. Besides, the method further includes fixing a fastening cover over the optical-lens pedestal so that the optical-lens group is fixed between the optical-lens pedestal and the fastening cover. The fastening cover is fixed on the optical-lens pedestal by means of hooks or screws.

To achieve the foregoing and other objectives, the present invention provides an apparatus for fastening adjustable optical lenses. The apparatus is suited for a scanning chassis and is used for fastening an optical-lens group. The scanning chassis includes a case, a light source, a reflector group and an optical sensor, wherein the light source, the reflector group and the optical sensor are mounted in the case.

The light source is used for illuminating a document and an image of the document is obtained. The reflector group reflects the image of the document to transmit it to the optical sensor through the optical-lens group. The optical-lens group includes at least one optical lens.

The apparatus for fastening adjustable optical lenses includes an optical-lens pedestal integrally formed in the case. The optical-lens pedestal has a channel and the two sides of the channel are open. There is at least one groove on the side wall of the channel. The optical lens of the optical-lens group can be mounted on the groove and the optical-lens group is located between the optical sensor and the reflector group. The optical-lens group can receive the image of the document and can form the image onto the optical sensor.

To achieve the foregoing and other objectives, the present invention further provides an adjustable optical scanning chassis. The adjustable optical scanning chassis includes a case, a light source, a reflector group, an optical sensor, an optical-lens group and an optical-lens pedestal. The light source is mounted in the case and used for illuminating a document so that an image of the document is obtained. The optical sensor is mounted in the case and used for receiving the image of the document. The optical-lens group is mounted in the case and has at least one optical lens. The reflector group is mounted in the case and reflects the image of the document to transmit it to the optical sensor through the optical-lens group. The optical-lens pedestal is located in the case. The optical-lens pedestal has a channel and the two sides of the channel are open. There is at least one groove on the side wall of the channel. The optical lens of the optical-lens group can be mounted on the groove and the optical-lens group is located between the optical sensor and the reflector group. The optical-lens group can receive the image of the document and can form the image onto the optical sensor.

According to a preferred embodiment of the present invention, the optical-lens pedestal is integrally formed in the case. The shape of the optical-lens pedestal matches that of the optical lens. Besides, the apparatus further includes a fastening cover fixed over the optical-lens pedestal so that the optical-lens group is fixed between the optical-lens pedestal and the fastening cover.

According to the feature of the invention, many grooves where many optical lenses are mounted are directly formed on a case of a scanning chassis when the case of the scanning chassis is formed using a process of injection molding. As a result, the optical-lens group can be directly fixed on the case of the scanning chassis. Therefore, the number of parts is decreased and the time for adjusting optical lenses is saved.

According to the feature of the invention, because many optical lenses can be mounted on groves that are directly formed on a case of the scanning chassis, the types and the number of the optical lenses can be changed according to.

Both the foregoing general description and the following detailed description are exemplary and explanatory only and are not restrictive of the invention, as claimed. It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. A simple description of the drawings is as follows.

DETAILED DESCRIPTION

Figure 1:
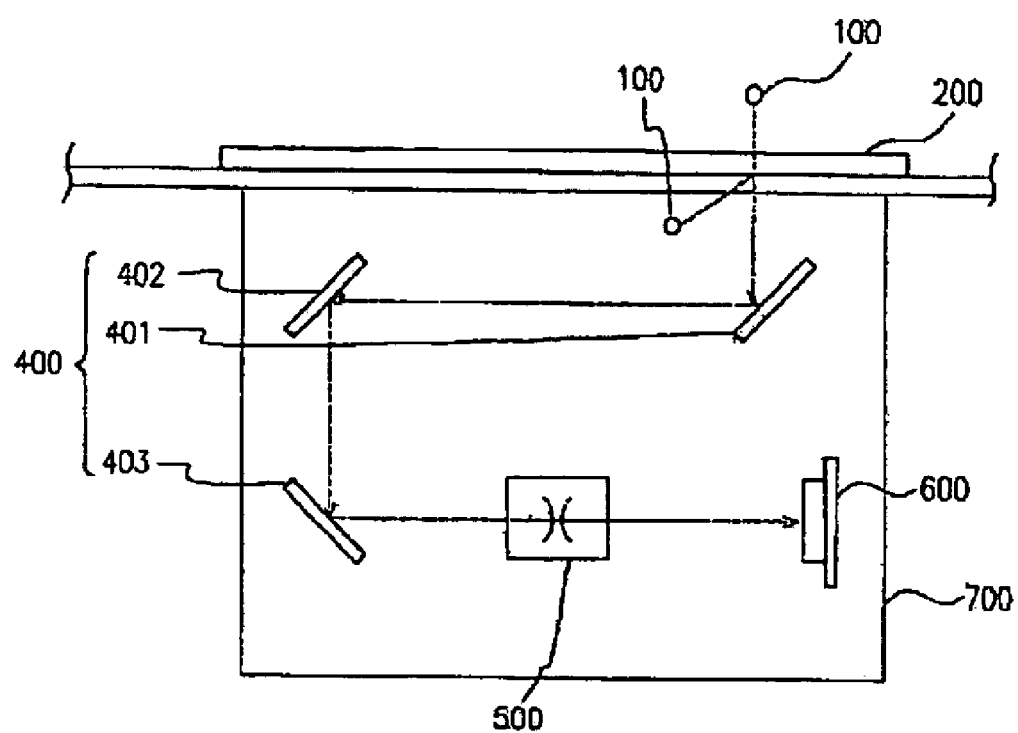
FIG. 1 is a cross-sectional view schematically showing a conventional optical scanner.
Figure 2:
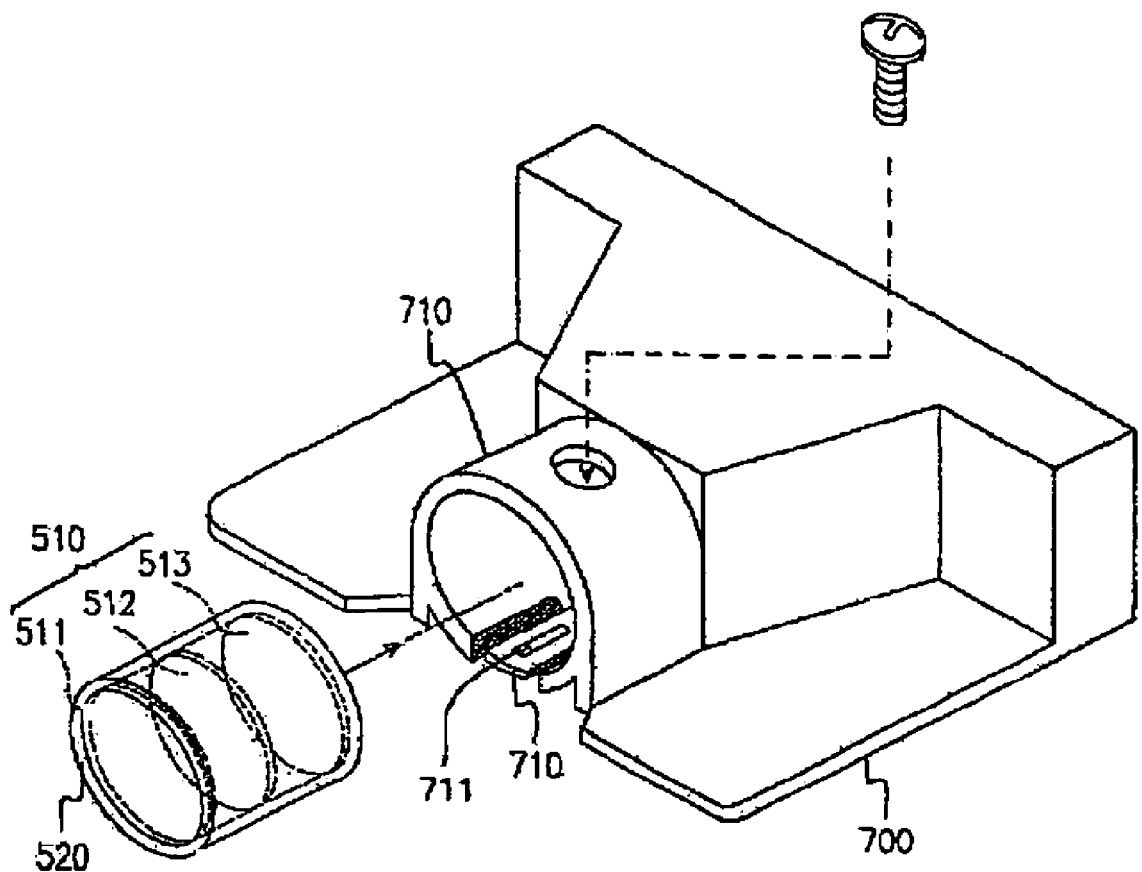
FIG. 2 is an exploded perspective view schematically showing a structure of fastening an optical-lens assembly in a conventional optical scanner.
Figure 3:
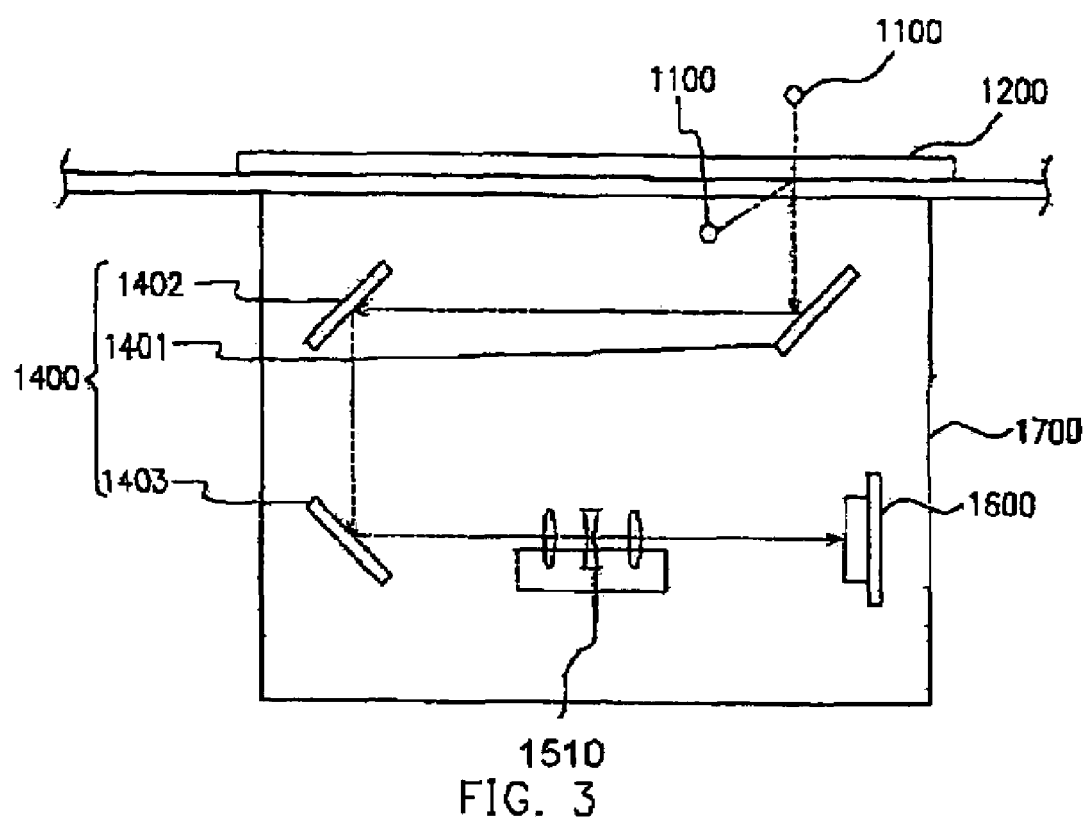
FIG. 3 is a cross-sectional view schematically showing an optical scanner according to an embodiment of the present invention.

Referring to FIG. 3, there is a scanning chassis of one embodiment of an optical scanner. A light source 1100, a reflector group 1400, an optical-lens group 1510, and an optical sensor, such as charged couple device (CCD) 1600, are mounted in a case 1700 of the scanning chassis. During scanning, after the light source 1100 illuminates a document 1200, an image of the document 1200 can be obtained. The reflector group 1400 is composed of many reflectors 1401, 1402, 1403 that reflect the image of the document 1200 to transmit it to the optical-lens group 1510. The optical-lens group 1510 can receive the image, transmitted by the reflector group 1400, of the document 1200 and can form the image onto the charged couple device 1600.

Figure 4:
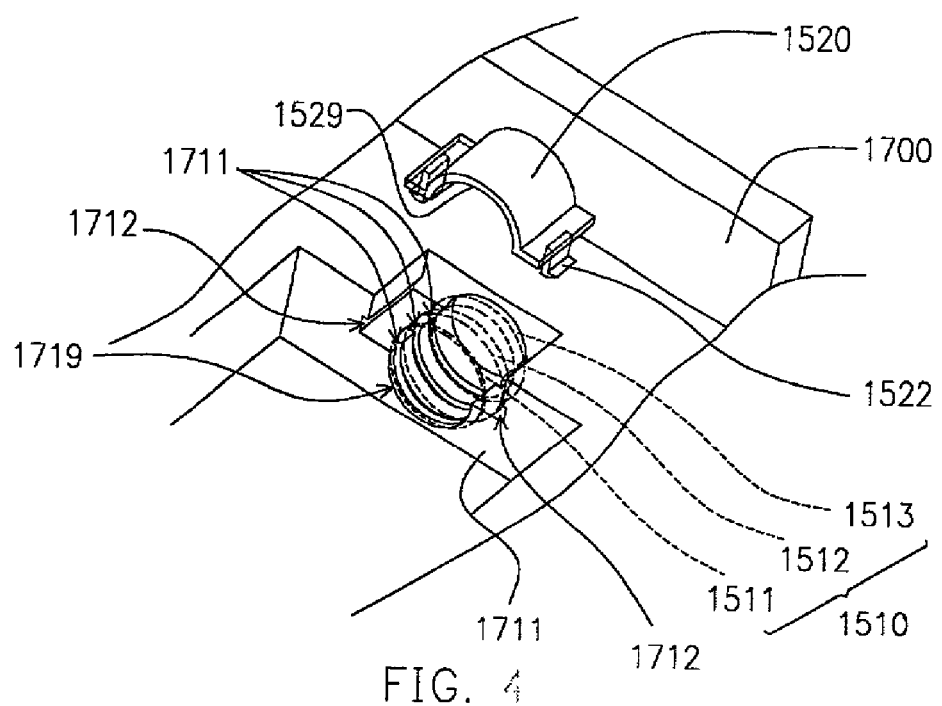
FIG. 4 is a perspective view schematically showing a structure of fastening optical lenses in an optical scanner according to an embodiment of the present invention.
Figure 5:
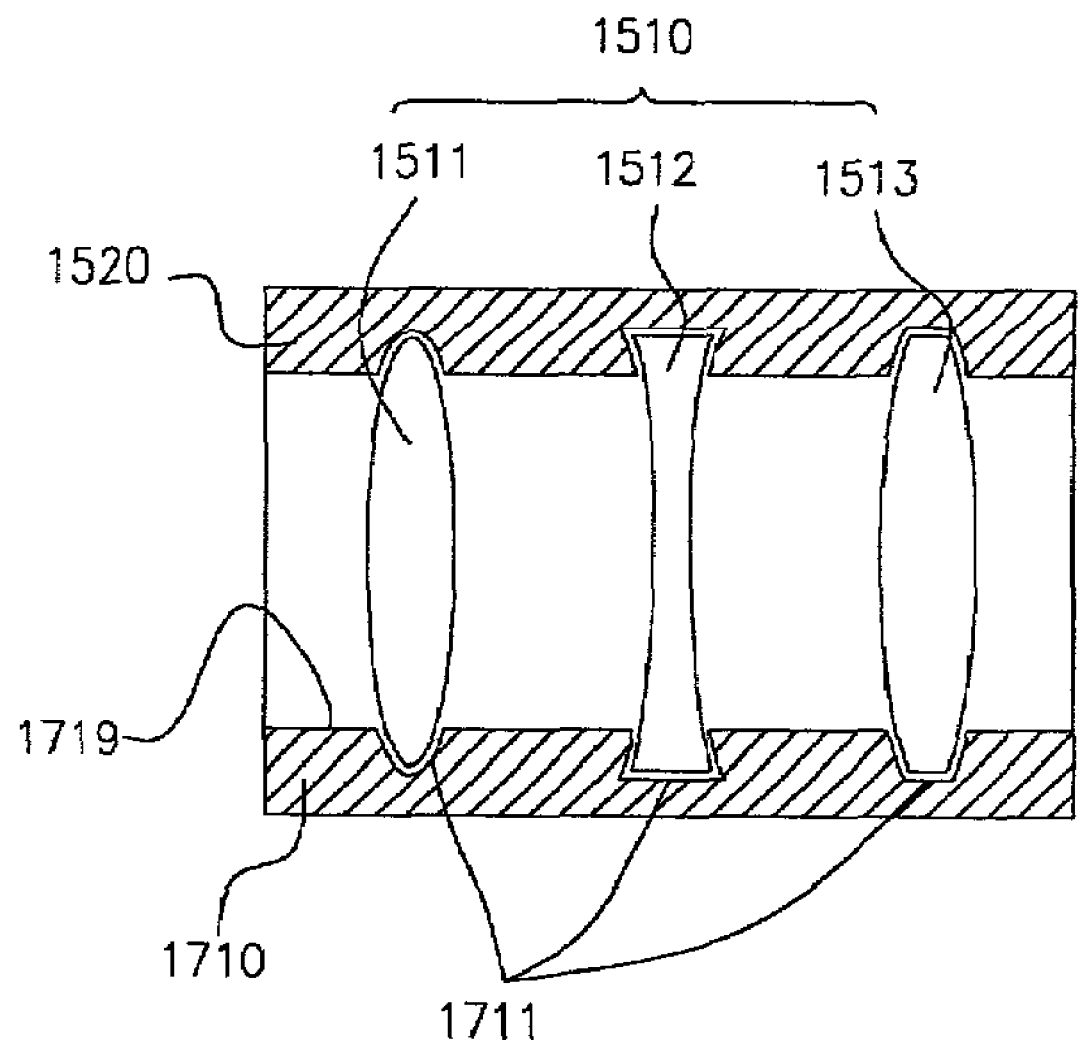
FIG. 5 is a cross-sectional view schematically showing a structure of fastening adjustable optical lenses, after fabricated, in an optical scanner according to an embodiment of the present invention.

In the following, a method for fastening adjustable optical lenses is described. As shown in FIG. 3, FIG. 4 and FIG. 5, first, the apparatus for fastening adjustable optical lenses is provided with an optical-lens pedestal 1710, integrally formed in the case 1700, and a fastening cover 1520. The optical-lens pedestal 1710 is located between the optical sensor 1600 and the reflector group 1400. The optical-lens pedestal 1710 has a channel 1719 and the two sides of the channel 1719 are open. There are many grooves 1711 on the side wall of the channel 1719. Next, the optical lens 1511, 1512, 1513 of the optical-lens group 1510 can be respectively mounted on the grooves 1711 and the relative position of the optical lens 1511, 1512, 1513 can be precisely adjusted. The optical-lens group 1510 is located between the optical sensor 1600 and the reflector group 1400. The optical-lens group 1510 can receive the image of the document and can form the image onto the optical sensor 1600. Following, the fastening cover 1520 is fixed on the optical-lens pedestal 1710 so that the optical lenses 1511, 1512, 1513 are firmly fixed between the optical-lens 1710 and the fastening cover 1520. The fastening cover 1520 is provided with two hooks 1522 that can be respectively coupled with two hooking ditches 1712 of the optical-lens pedestal 1710 so that the fastening cover 1520 can be firmly fixed on the optical-lens pedestal 1710.

Figure 6:
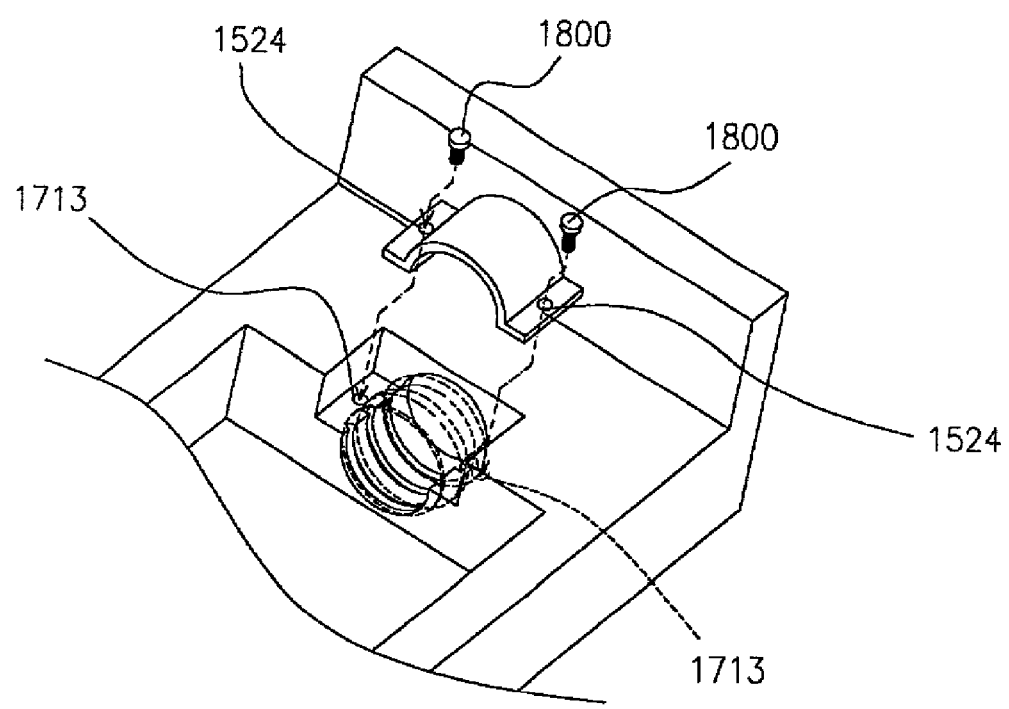
FIG. 6 is an exploded perspective view schematically showing a structure of fastening adjustable optical lenses by a fastening cover and screws in a conventional optical scanner according to an embodiment of the present invention.

In the above description, the fastening cover is fixed on the optical-lens pedestal by means of hooks and hooking ditches. However, the invention is not limited to the above application. As shown in FIG. 6, screws 1800 can be screwed through first screw holes 1524 of a fastening cover 1520 and then into second screw holes 1713 of a optical-lens pedestal 1710 so that the fastening cover 1520 can be firmly fixed or the optical-lens pedestal 1710. Otherwise, the fastening cover can be fixed on the optical-lens pedestal by coating an adhesive. Besides, if the optical lenses can be firmly fixed on the optical-lens pedestal, even a fastening cover can be saved.

The optical-lens pedestal 1710 and the grooves 1711 are directly formed on the case 1700 of the scanning chassis when the case 1700 of the scanning chassis is formed using a process of injection molding. The position where the grooves 1711 are formed on the optical-lens pedestal 1710 can be regulated by adjusting the mold. Therefore, the grooves 1711 can be precisely formed on the optical-lens pedestal 1710 and the relative position of the optical lenses 1511, 1512, 1513 mounted on the grooves 1711 can be precisely controlled. As a result, the time of adjusting the optical lenses 1511, 1512, 1513 can be saved and the number of parts can be decreased.

In the above embodiment, according to the cross-sectional shape, such as a shape as shown in FIG. 4, of the optical lenses 1511, 1512, 1513, that of the channel 1719 of the optical-lens pedestal 1710 can be designed as a half-round shape. However, the invention is not limited to the above-mentioned application. According to the various cross-sectional shapes of the optical lenses, the channel of the optical-lens pedestal can be designed as various cross-sectional shapes.

Accordingly, as shown in FIG. 4, in order to match the shape of the optical lenses 1511, 1512, 1513, the fastening cover 1520 can be designed with a channel 1529 cross-sectionally shaped as half-round. However, the invention is not limited to the above-mentioned application. According to the various cross-sectional shapes of the optical lenses, the channel of the fastening cover can be designed as various cross-sectional shapes.

In addition, the number of the grooves is not limited to three as shown in FIG. 3, FIG. 4, FIG. 5, FIG. 6, but any number of the grooves can be formed on the optical-lens pedestal. Besides, the type of the grooves is not limited, but any type of the grooves can be formed on the optical-lens pedestal. As a result, the types and the number of the optical lenses can be changed according to requirements.

To sum up, the present invention has the following advantages:

1. According to the present invention, the case can be integrally formed with the optical-lens pedestal, so the number of parts can be decreased and the cost can drop off.

2. According to the present invention, the grooves can be precisely formed on the optical-lens pedestal and the relative position of the optical lenses mounted on the grooves can be precisely controlled. As a result, the time of adjusting the optical lenses can be saved.

3. According to the present invention, the types and the number of the optical lenses can be changed according to requirements.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method for fastening adjustable optical lenses, the method suited for a scanning chassis and used for fastening an optical-lens group, the scanning chassis comprising a case, a light source, a reflector group and an optical sensor, the light source, the reflector group and the optical sensor being mounted in the case, the light source being used for illuminating a document and an image of the document being obtained, the reflector group reflecting the image of the document to transmit the image to the optical sensor through the optical-lens group, and the method comprising:

forming an optical-lens pedestal in the case, the optical-lens pedestal comprising at least one groove; and mounting the optical-lens group in a fixed position relative to the optical sensor on the at least one groove of the optical-lens pedestal, the optical-lens group located between the optical sensor and the reflector group, the optical lens group comprising two or more optical lenses, and the optical-lens group capable of receiving the image of the document and forming the image onto the optical sensor.

2. The method according to claim 1, wherein the optical-lens pedestal is integrally formed in the case.

3. The method according to claim 1, further comprising:

fixing a fastening cover over the optical-lens pedestal so that the optical-lens group is fixed between the optical-lens pedestal and the fastening cover.

4. The method according to claim 3, wherein the fastening cover is fixed on the optical-lens pedestal by means of hooks.

5. The method according to claim 3, wherein the fastening cover is fixed on the optical-lens pedestal by means of screws.

6. The method of claim 1, wherein mounting the optical-lens group comprises mounting the optical-lens group using an adhesive.

7. An apparatus for fastening adjustable optical lenses, the apparatus suited for a scanning chassis and used for fastening an optical-lens group comprising at least one optical lens, the scanning chassis comprising a case, a light source, a reflector group and an optical sensor, the light source, the reflector group and the optical sensor being mounted in the case, the light source being used for illuminating a document and an image of the document being obtained, the reflector group reflecting the image of the document to transmit the image to the optical sensor through the optical-lens group, and the apparatus comprising;

an optical-lens pedestal integrally formed in the case, the optical-lens pedestal comprising a first channel, the first channel comprising a side wall and two sides which are open, there being at least one groove on the side wall of the first channel, an optical lens of the optical-lens group capable of being mounted on the at least one groove, the optical-lens group being located in a fixed position relative to the optical sensor, and the optical-lens group capable of receiving the image of the document and forming the image onto the optical sensor.

8. The apparatus according to claim 7, wherein a cross-sectional shape of the first channel comprises a half-round shape.

9. The apparatus according to claim 7, further comprising a fastening cover fixed over the optical-lens pedestal so that the optical-lens group is fixed between the optical-lens pedestal and the fastening cover.

10. The apparatus according to claim 9, wherein the fastening cover further comprises a second channel, two sides which are open, and a cross-sectional shape of the second channel comprises a half-round shape.

11. The apparatus according to claim 9, wherein the fastening cover comprises a plurality of hooks and the optical-lens pedestal comprises a plurality of hooking ditches, the hooks coupled with the hooking ditches so that the fastening cover is firmly fixed on the optical-lens pedestal.

12. The apparatus according to claim 9, further comprising:

a plurality of screws;

a plurality of first screw holes in the fastening cover; and a plurality of second screw holes in the optical lens pedestal, the first screw holes corresponding to the second screw holes and the screws capable of being screwed through the first screw holes and into the second screw holes so that the fastening cover is capable of being firmly fixed on the optical-lens pedestal.

13. An optical scanning chassis, comprising:
a case;
a light source mounted in the case and used for illuminating a document so that an image of the document is obtained;
an optical sensor mounted in the case and used for receiving the image of the document;
an optical-lens group mounted in the case and having at least two optical lenses;
a reflector group mounted in the case and reflecting the image of the document to transmit the image to the optical sensor through the optical-lens group; and
an optical-lens pedestal located in the case, the optical-lens pedestal comprising a first channel, the first channel comprising a sidewall and two sides which are open, there being at least one groove on a side wall of the first channel, wherein an optical lens of the optical-lens group is mounted on the at least one groove, the optical-lens group is located between the optical sensor and the reflector group, and the optical-lens group is capable of receiving the image of the document and forming the image onto the optical sensor.

14. The optical scanning chassis according to claim 13, wherein a cross-sectional shape of the channel comprises a half-round shape.

15. The optical scanning chassis according to claim 13, further comprising a fastening cover fixed over the optical-lens pedestal such that the optical-lens group is fixed between the optical-lens pedestal and the fastening cover.

16. The optical scanning chassis according to claim 15, wherein the fastening cover comprises a second channel and two sides which are open, and the cross-sectional shape of the second channel comprises a half-round shape.

17. The optical scanning chassis according to claim 16, wherein the fastening cover comprises a plurality of hooks, the optical-lens pedestal comprises a plurality of hooking ditches, and the hooks are coupled with the hooking ditches such that the fastening cover is firmly fixed on the optical-lens pedestal.

18. The optical scanning chassis according to claim 16, further comprising:
a plurality of screws;
a plurality of first screw holes in the fastening cover; and
a plurality of second screw holes in the optical lens pedestal, the first screw holes corresponding to the second screw holes and the screws capable of being screwed through the first screw holes and into the second screw holes such that the fastening cover is firmly fixed on the optical-lens pedestal.

19. A method, comprising:
forming an optical-lens pedestal in a case of a scanning chassis, the scanning chassis comprising the case, a reflector group, an optical-lens group and an optical sensor, the optical-lens group comprising two or more optical lenses and capable of receiving an image of a document and forming the image onto the optical sensor, the optical-lens pedestal comprising at least one groove; and
mounting the optical-lens group on the at least one groove of the optical-lens pedestal, the optical-lens group being located in a fixed position relative to the optical sensor.

20. The method according to claim 19, wherein the optical-lens pedestal is integrally formed in the case.

21. The method according to claim 19, further comprising fixing a fastening cover over the optical-lens pedestal thereby fixing the optical-lens group between the optical-lens pedestal and the fastening cover.

22. The method according to claim 21, wherein fixing the fastening cover comprises fixing the fastening cover on the optical-lens pedestal by at least one hook.

23. The method according to claim 21, wherein fixing the fastening cover comprises fixing the fastening cover on the optical-lens pedestal by at least one screw.

24. The method of claim 21, wherein fixing the fastening cover comprises fixing the fastening cover on the optical-lens pedestal using an adhesive.

25. An apparatus, comprising:
an optical-lens pedestal integrally formed in a case of a scanning chassis, the scanning chassis comprising the case, a reflector group, an optical-lens group and an optical sensor, the optical-lens group comprising at least two optical lenses located between the optical sensor and the reflector group and being capable of receiving an image of a document and forming the image on the optical sensor, the optical-lens pedestal comprising a first channel, the first channel comprising a side wall and two sides that are open, at least one groove being on the side wall of the first channel, and an optical lens of the optical-lens group being capable of being mounted on the at least one groove in a fixed position relative to the optical sensor.

26. The apparatus according to claim 25, wherein a cross-sectional shape of the channel comprises a half-round shape.

27. The apparatus according to claim 25, further comprising a fastening cover fixed over the optical-lens pedestal.

28. The apparatus according to claim 27, wherein the fastening cover further comprises a second channel, the second channel comprising two sides that are open, and a cross-sectional shape of the second channel comprises a half-round shape.

29. The apparatus according to claim 27,
wherein the fastening cover comprises a plurality of hooks,
wherein the optical-lens pedestal comprises a plurality of hooking ditches, and
wherein the hooks are capable of being respectively coupled with the hooking ditches thereby fixing the fastening cover on the optical-lens pedestal.

30. The apparatus according to claim 27, further comprising a plurality of screws,
wherein the fastening cover comprises a plurality of first screw holes,
wherein the optical-lens pedestal comprises a plurality of second screw holes, and
wherein the first screw holes correspond to the second screw holes and the screws are capable of being screwed through the first screw holes and into the second screw holes thereby fixing the fastening cover on the optical-lens pedestal.

31. An optical scanning chassis, comprising:
a case;
an optical sensor capable of receiving an image of a document;
an optical-lens group mounted in the case and having at least two optical lenses;
a reflector group mounted in the case and reflecting the image of the document to transmit the image to the optical sensor through the optical-lens group; and
an optical-lens pedestal located in the case, the optical-lens pedestal comprising a channel, the channel comprising a side wall, two sides that are open, and at least one groove on the side wall of the channel, an optical lens of the optical-lens group capable of being mounted on the at least one groove, the optical-lens group capable of being located between the optical sensor and the reflector group, the optical-lens group capable of receiving the image of the document and forming the image on the optical sensor.

32. The optical scanning chassis according to claim 31, wherein a cross-sectional shape of the channel comprises a half-round shape.

33. The optical scanning chassis according to claim 31, further comprising a fastening cover fixed over the optical-lens pedestal thereby fixing the optical-lens group between the optical-lens pedestal and the fastening cover.

34. The optical scanning chassis according to claim 33, wherein the fastening cover comprises a second channel, the second channel comprising two sides that are open, and wherein a cross-sectional shape of the second channel comprises a half-round shape.

35. The optical scanning chassis according to claim 33,
wherein the fastening cover comprises a plurality of hooks,
wherein the optical-lens pedestal comprises a plurality of hooking ditches, and
wherein the hooks are capable of being coupled with the hooking ditches thereby fixing the fastening cover on the optical-lens pedestal.

36. The optical scanning chassis according to claim 33, further comprising a plurality of screws,
wherein the fastening cover comprises a plurality of first screw holes,
wherein the optical-lens pedestal comprises a plurality of second screw holes,
wherein the first screw holes corresponds to the second screw holes, and
wherein the screws are capable of being screwed through the first screw holes and into the second screw holes thereby fixing the fastening cover on the optical-lens pedestal.

37. An apparatus, comprising:
an optical-lens pedestal integrally formed in a case of a scanning chassis, the scanning chassis comprising the case, a reflector group, an optical-lens group and an optical sensor, the optical-lens group comprising at least two optical lenses located between the optical sensor and the reflector group and capable of receiving an image of a document and forming the image on the optical sensor, the optical-lens pedestal comprising a first channel, the first channel comprising a side wall, two sides that are open, and at least one groove on the side wall of the first channel, and an optical lens of the optical-lens group being capable of being mounted on the at least one groove; and
means for fastening a cover over the optical-lens pedestal thereby fixing the optical-lens group between the optical-lens pedestal and the fastening cover.

38. The apparatus according to claim 37, wherein the means for fastening further comprises a second channel, the second channel comprising two sides that are open, and a cross-sectional shape of the second channel comprises a half-round shape.

39. The apparatus according to claim 37,
wherein the means for fastening comprises a plurality of hooks,
wherein the optical-lens pedestal comprises a plurality of hooking ditches, and
wherein the hooks are capable of being coupled with the hooking ditches thereby fixing the cover on the optical-lens pedestal.

40. The apparatus according to claim 37,
wherein the means for fastening comprises a plurality of screws,
wherein the cover comprises a plurality of first screw holes,
wherein the optical-lens pedestal comprises a plurality of second screw holes, and
wherein the first screw holes correspond to the second screw holes, and the screws are capable of being screwed through the first screw holes and into the second screw holes thereby fixing the cover on the optical-lens pedestal.

41. An optical scanning chassis, comprising:
a case;
an optical sensor capable of receiving an image of a document;
an optical-lens group mounted in the case and having at least two optical lenses;
a reflector group mounted in the case and reflecting the image of the document to transmit the image to the optical sensor through the optical-lens group;
an optical-lens pedestal located in the case, the optical-lens pedestal comprising a channel, the channel comprising a side wall, two sides that are open, and at least one groove on the side wall of the channel, an optical lens of the optical-lens group capable of being mounted on the at least one groove, the optical-lens group capable of being located between the optical sensor and the reflector group, the optical-lens group capable of receiving the image of the document and forming the image on the optical sensor; and
means for fastening a cover over the optical-lens pedestal thereby fixing the optical-lens group between the optical-lens pedestal and the fastening cover.

42. The optical scanning chassis according to claim 41, wherein a cross-sectional shape of the channel comprises a half-round shape.

43. The optical scanning chassis according to claim 41,
wherein the means for fastening comprises a second channel, the second channel comprising two ends that are open, and
wherein a cross-sectional shape of the second channel comprises a half-round shape.

44. The optical scanning chassis according to claim 41,
wherein the means for fastening comprises a plurality of hooks coupled to the cover,
wherein the optical-lens pedestal comprises a plurality of hooking ditches, and
wherein the hooks are capable of being coupled with the hooking ditches thereby fixing the cover on the optical-lens pedestal.

45. The optical scanning chassis according to claim 41,
wherein the means for fastening comprises a plurality of screws,
wherein the cover comprises a plurality of first screw holes,
wherein the optical-lens pedestal comprises a plurality of second screw holes,
wherein the first screw holes corresponds to the second screw holes, and
wherein the screws are capable of being screwed through the first screw holes and into the second screw holes thereby fixing the cover on the optical-lens pedestal.

* * * * *

UNITED STATES PATENT AND TRADEMARK OFFICE
CERTIFICATE OF CORRECTION

PATENT NO. : 7,333,248 B2  Page 1 of 1
APPLICATION NO. : 10/063433
DATED : February 19, 2008
INVENTOR(S) : Jen-Shou Tseng et al.

It is certified that error appears in the above-identified patent and that said Letters Patent is hereby corrected as shown below:

At column 6, line 29, delete ";" and insert --:--, therefor.

At column 9, line 31, delete "corresponds" and insert -- correspond --, therefor.

At column 10, line 59, delete "corresponds" and insert -- correspond --, therefor.

Signed and Sealed this

Ninth Day of March, 2010

David J. Kappos
*Director of the United States Patent and Trademark Office*